Figure 1:
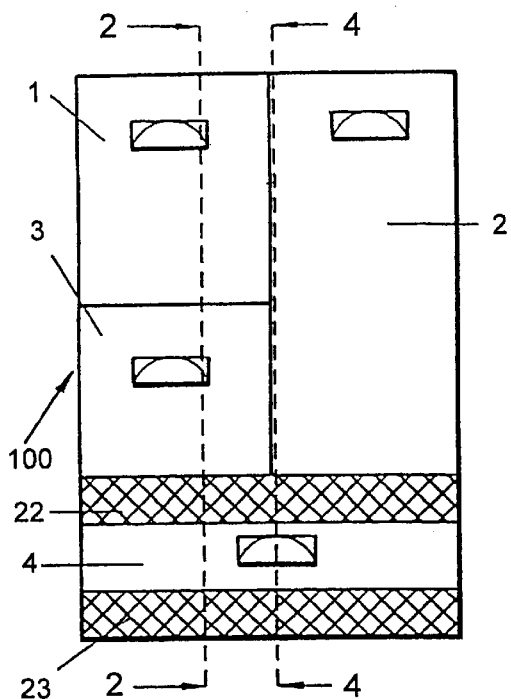

United States Patent

Grønne

Patent Number: 6,092,382
Date of Patent: Jul. 25, 2000

[54] KITCHEN UNIT AND THE USE THEREOF FOR THE HANDLING OR PORTIONS OF KITCHEN GARBAGE AT THE SOURCE

[75] Inventor: Ebbe Grønne, Greve, Denmark

[73] Assignee: Gronne's Miljo ApS, Greve, Denmark

[21] Appl. No.: 08/849,959

[22] PCT Filed: Nov. 29, 1995

[86] PCT No.: PCT/DK95/00481

§ 371 Date: Jun. 6, 1997

§ 102(e) Date: Jun. 6, 1997

[87] PCT Pub. No.: WO96/17796

PCT Pub. Date: Jun. 13, 1996

[30] Foreign Application Priority Data

Dec. 8, 1994 [DK] Denmark ............................ 9400457 U

[51] Int. Cl.[7] .................................................. F25B 27/00
[52] U.S. Cl. .................. 62/238.6; 62/324.4; 62/174; 62/149; 62/238.6; 62/197; 62/441; 62/331; 62/78
[58] Field of Search ..................... 62/324.4, 174, 62/238.6, 197, 441, 331, 78, 149

[56] References Cited

U.S. PATENT DOCUMENTS 4,338,730  7/1982  Tatsumi et al. ............................ 34/54
4,682,699  7/1987  Ertley .......................................... 211/71
5,388,427  2/1995  Lee ............................................ 62/331

*Primary Examiner*—Henry Bennett
*Assistant Examiner*—Mark Shulman
*Attorney, Agent, or Firm*—Nims, Howes, Collison Hansen & Lackert

[57] ABSTRACT

The invention relates to a kitchen unit (100) for the handling of portions of household garbage at the source, i.e. in the individual households, said kitchen unit being in the form of a box, which fits into a kitchen table. The first compartment (7) is connected to a refrigeration unit having an evaporator (13) in the first compartment (7) and a condenser (14) which is placed under the bottom in the second compartment (17), so that the heat from the condenser (14) can rise up through a grating (21) into the second compartment (17). The first compartment (7) is insulated against heat on five (6, 8, 9, 10, 11) of its six walls, while the sixth wall (15) is formed using a heat-conducting material. The moisture from wet garbage which is deposited in the second compartment (17) is evaporated by the heat from the condenser and rises to meet the cold wall (15). Consequently, the vapor condenses and drips down this wall to a drip-tray (18), from which the condensate is led to a dish (20) via a tube (19).

17 Claims, 1 Drawing Sheet

KITCHEN UNIT AND THE USE THEREOF FOR THE HANDLING OR PORTIONS OF KITCHEN GARBAGE AT THE SOURCE

BACKGROUND OF THE INVENTION

The invention relates to a kitchen unit for the handling of portions of household garbage at the source, i.e. in the individual households, said kitchen unit being in the form of a box, preferably a module, which fits into a kitchen table.

The invention also relates to the use of said kitchen unit for the handling of portions of household garbage at the source, i.e. in the individual households, whereby with said use the household garbage is divided into two portions.

Out of regard for the environment, it must be seen to be an objective to re-use organic kitchen garbage such as potato peelings, meat leavings and similar materials as fodder, for example for pigs and other domestic or breeding animals. In addition to organic garbage, the sorting at the source also includes paper, glass, cardboard, tin cans and plastic containers.

This makes it necessary for the garbage to be sorted at the source, which will be effective only if said sorting is made as easy as possible, which means that it must take place immediately in the ordinary household kitchens in connection with the preparation of foodstuffs.

Furthermore, the collection must be arranged in such a manner that it is not necessary for the housewife, for example in a multi-story apartment house, to go to a central collection point with even the smallest portion of garbage. This means that the possibility must be established of storing the garbage in the kitchen until a suitable amount of garbage can justify the inconvenience involved in transferring the garbage to the central collection point, in which case said transfer can be expected to take place only once or twice during the course of a week.

With a transfer which takes place only once or twice a week, there is the disadvantage that the organic material which is stored in a kitchen at around 20° C. will begin to putrefy, the result being that it not only becomes unusable, but also that it starts to smell.

THE KNOWN TECHNIQUE

From EP patent publication No. 0 298 322, there is known a piece of kitchen equipment which consists of several compartments in which individual containers are placed to receive each their kind of garbage.

The individual container for the receipt of the organic material is placed in a cold storage box which is insulated against heat and can cool the garbage to a temperature of, for example, 5° C. or less. Therefore, when stored for no longer than a week, the organic material will not start to putrefy and thus not be ruined.

However, there remains a disadvantage in connection with moist paper and cardboard which has been used for the packaging of foodstuffs, whereby the paper and the cardboard has been more or less soaked through by meat juices or has been defiled by fatty substances of different kinds, and can therefore begin to putrefy and to smell in the kitchen.

This putrefaction can be avoided if such packagings are dried so that there is no bacterial growth with subsequent putrefaction. A drying can be effected by the application of heat, but this requires energy without being economically expedient.

THE OBJECT OF THE INVENTION

With the invention it is desired to provide a kitchen unit of the kind disclosed in the preamble, in that with said kitchen unit the drying of the wet packaging can be effected in the most economical manner possible, and the storage can take place under such conditions that the used packaging does not start to putrefy, even when stored in a warm kitchen for longer periods.

The new feature of the invention is that the kitchen unit has a refrigeration circuit and a first heat insulated compartment which is arranged for the storage of a first portion of especially wet garbage which is intended to be cooled, in that the refrigeration circuit's evaporator is placed in said first compartment, and a second compartment which is arranged for the storage of a second portion of garbage which preferably has a low concentration of wet material, in that the refrigeration circuit's condenser or parts thereof are placed in said second compartment.

When using the kitchen unit in the individual households, where the household garbage is according to the invention divided into two portions, namely the following:

1) a first portion consisting substantially of organic, mainly wet garbage which can be reused, this first portion being placed in the first compartment and cooled to a temperature at which putrefaction or fermentation is brought substantially to an end, for example approx. 4° C., and 2) a second portion of mainly non-homogeneous material, for example wet cans, wet packaging paper and similar materials, this second portion being placed in the second compartment and dried so that it can not putrefy or ferment, the subject kitchen unit makes it possible to utilize the surplus heat which arises with the cooling of the organic material in the drying of the wet packaging without any extra application of heat, and thus energy is saved while at the same time the organic material can be stored for a longer period of time without any unpleasant odors and without putrefaction.

It is advantageous that the first compartment and the second compartment have a common wall which is less insulated than those remaining walls of the first compartment which may be common with the second compartment, and that there are means for the collection of condensate from this wall at that side which faces inwards towards the second compartment.

During the drying, the evaporated moisture will hereby condense on and run down the common wall, so that the condensate can be led to the surroundings and the drying of the moist garbage be accelerated.

It is also an advantage with the disclosed kitchen unit, where only a part of the refrigeration circuit's condenser is placed in the second compartment, that it is the warmest end of the condenser which is placed in the second compartment, while the remaining parts of the condenser are placed completely outside the compartments, i.e. outside the kitchen unit.

In the disclosed kitchen unit according to the invention, it is also advantageous that the walls of the second compartment are of sheet metal, in that the conduction of heat through the common wall is herewith improved.

The kitchen unit according to the invention is advantageously provided with an adjustable induction opening, and elements in the form of a ventilation channel or chimney which is connected to the outside surroundings and arranged for the evacuation of heat from the second compartment.

The kitchen unit according to the invention also comprises a ventilation fan which is mounted in or in connection with the ventilation channel.

During the use of the kitchen unit according to the invention, it is advantageous that the cooled-down first portion, while still in a cooled state, is transported to a plant for processing, possibly via an intermediate storage station, and that the dried second portion, preferably at the same time as the first portion, is transported away for treatment, for example for sorting or burning.

It is also advantageous during use that garbage with relatively low moisture content is sorted out before the cooling of the first portion and subjected to heating with the heat derived from the cooling process.

The kitchen unit according to the invention will be explained more explicitly in the following detailed description with reference to the figures in the drawing.

THE DRAWING

Figure 2:
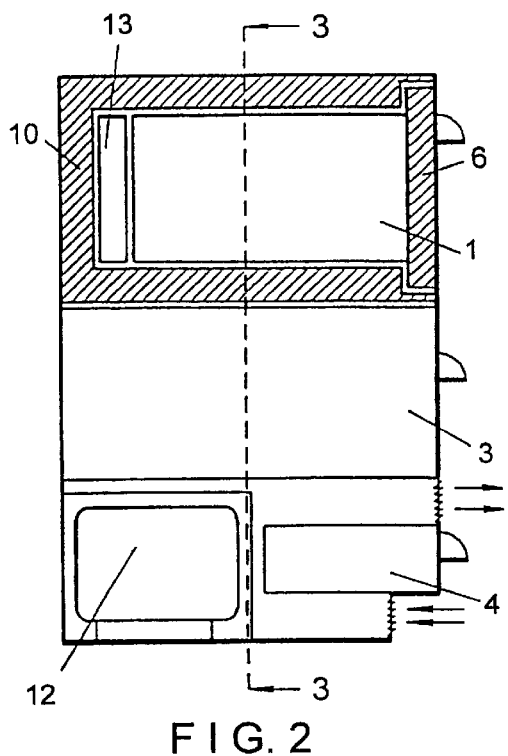
Figure 3:
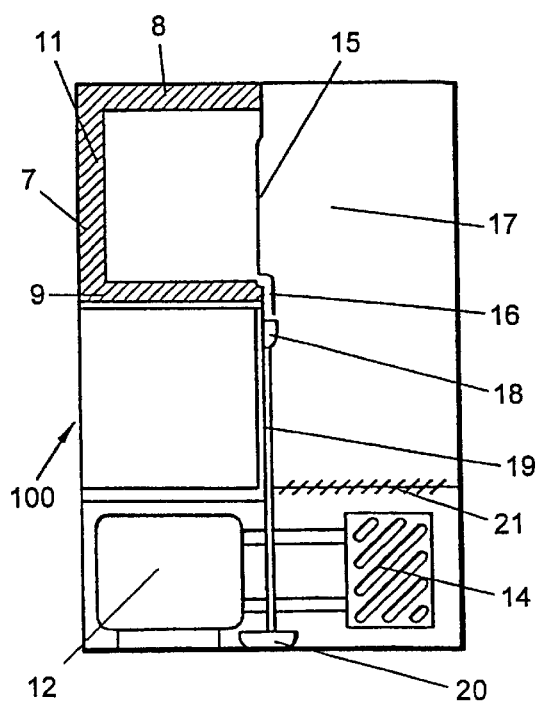
Figure 4:
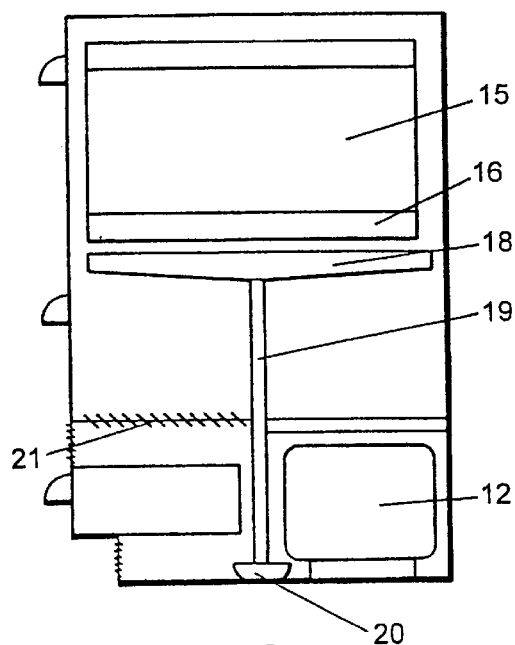

The invention will now be described in more detail with reference to the drawing, where FIG. 1 shows a kitchen unit according to the invention seen from the front, FIG. 2 shows a section in the kitchen unit according to the invention along the line II—II in FIG. 1, FIG. 3 shows a section in the kitchen unit according to the invention along the line III—III in FIG. 2, and FIG. 4 shows a section in the kitchen unit according to the invention along the line IV—IV in FIG. 1.

DESCRIPTION OF THE EXAMPLE EMBODIMENT

In the drawing is shown a kitchen unit 100 according to the invention, said kitchen unit 100 being configured, for example, as a box or kitchen element with dimensions which correspond to those recommended for kitchen modules. Thus the kitchen unit 100 is of a height which enables it to be placed under a normal kitchen table in the place for or in the same way as, for example, a dishwasher or an ordinary cupboard element.

The kitchen unit 100 has a first, a second, a third and a fourth drawer 1, 2, 3 and 4 respectively, all of which are mounted on slide rails or similar elements which allow the drawers to be pulled out in an easy and convenient manner. There can be provided a number of drawers which corresponds to the number of the individual types of garbage which are to be sorted at the source. Consequently, it must be understood that the kitchen unit can comprise either more or fewer drawers than the four which are shown.

The second and the third drawers 2 and 3 can, for example, be intended for the storage of bottles and glass and newspapers respectively, but in addition to these drawers there can also be an additional drawer for the collection of empty cans of metal.

The invention relates only to the first drawer 1 and the second drawer 2, where the first drawer 1 is intended for the collection of organic garbage such as potato peelings, meat leavings and similar organic materials, which after further treatment will be suitable for reuse as pigfood or fodder for other domestic animals, while the second drawer 2 is intended for the collection of paper or cardboard which has been used as packaging for foodstuffs, so that these packagings have been sullied by meat juices or fatty substances.

The first drawer 1 has an heat insulated frontplate 6, and is placed in a first compartment 7 in a manner which enables it to be drawn out, said compartment 7 having a insulated top 8, an insulated bottom 9, an insulated rear wall 10 and an insulated side wall 11 which faces away from the second drawer 2. When the first drawer 1 is inserted in the compartment 7, it will thus be insulated against heat on five of the six surfaces in the compartment 7.

The compartment 7 is connected to a commonly-known refrigeration unit with a compressor 12 which is placed in the bottom of the kitchen unit 100. The refrigeration unit comprises an evaporator 13 placed inside the compartment 7 and close to the rear wall 10 or at the top of same, and a condenser 14 placed in the bottom of the kitchen unit 100.

In a commonly-known manner, the first drawer 1 is tightened in relation to the compartment 7 by means of a magnetic sealing strip arranged along the inner side of the front-plate 6.

The drawer can be provided with means (not shown) for the suspension of one or more garbage bags.

By means of the refrigeration unit, organic materials which are deposited in the first drawer 1 can thus be cooled down to a temperature of 5° C. or below, hereby delaying the activity of bacteria which can give rise to putrefaction.

The sixth side surface in the compartment 7, which faces towards the second drawer 2, is closed with a wall 15 of a material with high thermal conductivity, such as a metal plate.

The lowermost edge 16 of the wall 15 is cranked outwards in such a way that the edge 16 extends substantially vertically and some distance inside a compartment 17, which is configured to accommodate the second drawer 2.

Arranged below the whole length of the edge 16 there is a drip tray 18, this being connected to a tube 19 which leads down to a dish 20 in the bottom of the kitchen unit 100.

The bottom of the compartment 17 for the second drawer 2 is configured as a grating 21, and at least one part of the refrigeration unit's condenser 14 is arranged under the grating 21, so that the heat radiated from the condenser 14 can be led up into the compartment 17.

The second drawer 2 is arranged to receive bags (not shown in the drawing) one at a time for the collection of paper or cardboard which has been used for the packaging of foodstuffs or similar materials. Therefore, the drawer 2 is provided along the inner side of its upper edge with hooks for the fastening of these bags. The bags are preferably of a moisture-absorbing material, for example paper. In order to prevent the liquid from the moisture content from running down and out of the compartment 17, the inner walls in the second drawer 2 can be lined in a detachable manner with a water-proof bag, for example of plastic.

Opposite the refrigeration unit, which is placed in the bottom of the kitchen unit 100, the front of the kitchen unit is provided with gratings 22 and 23 which allow air to circulate out of regard for the function of the refrigeration unit. Because of the grating 21 in the bottom of the compartment 17 for the second drawer 2, the surplus heat from this compartment can also be led out to the kitchen unit's surroundings. Alternatively, in order to ensure a complete ventilation, the kitchen unit 100 can also be connected to the atmosphere through a suitable pipe leading to the outside surroundings, for example via a vapour hood or a similar kitchen element.

Following this description of the manner in which the kitchen unit 100 is arranged, its use will now be explained.

Organic garbage, such as food scraps, which are suitable for reuse as, for example, fodder for domestic animals, are deposited in the first drawer 1, so that this garbage by its storage in the compartment 7 is cooled down to a temperature of between +2° C. and −2° C., the result being that the garbage does not putrefy, even when stored for longer periods of time.

The refrigeration unit extracts heat from the compartment 7, and this heat is brought to the condenser 14 from where it rises up into the compartment 17.

Moist packaging which has been used for the transport of foodstuffs, and which has therefore been sullied with blood, meat juices and/or fatty substances, is deposited in a bag in the second drawer 2. As a consequence of the heat from the condenser 14, the water vapour from the packaging rises upwards and meets the cold wall 15, whereby the moisture condenses on the wall and drips down this wall to the edge 16. From here, the condensate drips down into the drip-tray 18 and is led down through the tube 19 to the dish 20. The water collected in the dish 20 can be emptied from time to time. A part of the water vapour will also be led to the kitchen via the gratings 22 and 23.

The moist packaging is dried by this process. Consequently, the activity of putrefaction bacteria is prevented and unpleasant smells can not arise during the storage.

I claim:

1. A kitchen unit for handling household garbage in each individual household, the kitchen unit comprising a box having a refrigeration circuit, a first heat insulated compartment which is arranged for the storage of a first portion of garbage which is to be cooled down, the refrigeration circuit having an evaporator placed in the first compartment, the kitchen unit having a second compartment which is arranged for the storage of a second portion of garbage, the refrigeration circuit having a condenser, at least part of the condenser being placed in the second compartment, wherein a hot end of the condenser is placed in the second compartment, a remaining part of the condenser placed completely outside the first and second compartments.

2. A kitchen unit according to claim 1 wherein the first compartment and the second compartment are defined by insulated walls and the first compartment and the second compartment have a common non-insulated wall, and means for collecting condensate from the common wall at a side which faces inward towards the second compartment.

3. The kitchen unit according to claim 1 wherein a hot end of the condenser is placed in the second compartment, a remaining part of the condenser placed completely outside the first and second compartments.

4. A kitchen unit for handling household garbage in each individual household, the kitchen unit comprising a box having a refrigeration circuit, a first heat insulated compartment which is arranged for the storage of a first portion of garbage which is to be cooled down, the refrigeration circuit having an evaporator placed in the first compartment, the kitchen unit having a second compartment which is arranged for the storage of a second portion of garbage, the refrigeration circuit having a condenser, at least part of the condenser being placed in the second compartment, the walls of the second compartment made of sheet metal.

5. A kitchen unit for handling household garbage in each individual household, the kitchen unit comprising a box having a refrigeration circuit, a first heat insulated compartment which is arranged for the storage of a first portion of garbage which is to be cooled down, the refrigeration circuit having an evaporator placed in the first compartment, the kitchen unit having a second compartment which is arranged for the storage of a second portion of garbage, the refrigeration circuit having a condenser, at least part of the condenser being placed in the second compartment, the kitchen unit further having an adjustable induction opening and a ventilation channel connected to outside surroundings and arranged for the evacuation of heat from the second compartment.

6. The kitchen unit according to claim 5 wherein the kitchen unit has a ventilation fan in association with the ventilation channel.

7. A kitchen unit for handling household garbage in each individual household, the kitchen unit comprising a box having a refrigeration circuit, a first heat insulated compartment which is arranged for the storage of a first portion of garbage which is to be cooled down, the refrigeration circuit having an evaporator placed in the first compartment, the kitchen unit having a second compartment which is arranged for the storage of a second portion of garbage, the refrigeration circuit having a condenser, at least part of the condenser being placed in the second compartment, the household garbage divided into two portions, a first portion of substantially organic, wet garbage, the first portion being placed in the first compartment and cooled down to a temperature at which putrefaction or fermentation is brought substantially to an end, and a second portion of substantially non-homogeneous material which is deposited in the second compartment and dried.

8. The kitchen unit of claim 7 wherein the second portion of substantially non-homogeneous material comprises wet cans, and wet packaging material.

9. The kitchen unit of claim 1 wherein the first compartment is cooled down to approximately 4° C.

10. A kitchen unit for handling household garbage in each individual household, the kitchen unit comprising a box having a refrigeration circuit, a first heat insulated compartment which is arranged for the storage of a first portion of garbage which is to be cooled down, the refrigeration circuit having an evaporator placed in the first compartment, the kitchen unit having a second compartment which is arranged for the storage of a second portion of garbage, the refrigeration circuit having a condenser, at least part of the condenser being placed in the second compartment;

the first compartment and the second compartment defined by insulated walls, the first compartment and the second compartment having a common non-insulated wall, and means for collecting condensate from the common wall at a side which faces inward towards the second compartment; and a hot end of the condenser located in the second compartment, a remaining part of the condenser placed completely outside the first and second compartments.

11. A kitchen unit for handling household garbage in each individual household, the kitchen unit comprising a box having a refrigeration circuit, a first heat insulated compartment which is arranged for the storage of a first portion of garbage which is to be cooled down, the refrigeration circuit having an evaporator placed in the first compartment, the kitchen unit having a second compartment which is arranged for the storage of a second portion of garbage, the refrigeration circuit having a condenser, at least part of the condenser being placed in the second compartment;

the first compartment and the second compartment defined by insulated walls, the first compartment and the second compartment having a common non-insulated wall, and means for collecting condensate from the common wall at a side which faces inward towards the second compartment;

a hot end of the condenser located in the second compartment, a remaining part of the condenser placed completely outside the first and second compartments; and an adjustable induction opening and a ventilation channel connected to outside surroundings and arranged for the evacuation of heat from the second compartment.

12. A method for handling portions of household garbage in each individual household, the method comprising:

providing a kitchen unit in the form of a box, the kitchen unit having a refrigeration circuit and a first heat insulated compartment arranged for the storage of a first portion of garbage which is intended to be cooled down, the refrigeration circuit having an evaporator placed in the first compartment, and having a second compartment which is arrange for the storage of a second portion of garbage, the refrigeration circuit having a condenser, at least part of the condenser being placed in the second compartment;

dividing the garbage in two portions, a first portion of substantially organic especially wet garbage and a second portion of substantially non-homogeneous material;

placing the first portion of garbage into the first compartment and cooling down the first portion to a temperature at which putrefaction or fermentation is put substantially to an end; and, placing the second portion of garbage in the second compartment and drying the second portion with heat derived from the cooling process.

13. The method according to claim 12 wherein at least part of the heat derived from the cooling of the first portion is used for drying the second portion.

14. The method according to claim 12 further comprising transporting the cooled down first portion of garbage to a plant for processing.

15. The method according to claim 12 further comprising transporting the dried second portion of garbage to a plant for processing.

16. The method according to claim 12 further comprising sorting the first portion of garbage and placing a portion of the first portion in the second compartment for drying in the second compartment.

17. The method according to claim 12 further comprising venting the second compartment for transporting away vapor which rises during drying.

* * * * *